(12) United States Patent
Ueno et al.

(10) Patent No.: US 9,507,428 B2
(45) Date of Patent: Nov. 29, 2016

(54) ELECTRONIC DEVICE, CONTROL METHOD, AND CONTROL PROGRAM

(75) Inventors: Yasuhiro Ueno, Yokohama (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 98 days.

(21) Appl. No.: 14/007,313

(22) PCT Filed: Mar. 23, 2012

(86) PCT No.: PCT/JP2012/057603
§ 371 (c)(1),
(2), (4) Date: Sep. 24, 2013

(87) PCT Pub. No.: WO2012/133227
PCT Pub. Date: Oct. 4, 2012

(65) Prior Publication Data
US 2014/0015794 A1 Jan. 16, 2014

(30) Foreign Application Priority Data
Mar. 25, 2011 (JP) ................................. 2011-068968

(51) Int. Cl.
*G06F 3/045* (2006.01)
*G06F 3/01* (2006.01)
(Continued)

(52) U.S. Cl.
CPC ........... *G06F 3/017* (2013.01); *G06F 3/04815* (2013.01); *G06F 3/04883* (2013.01); *G06F 2203/04101* (2013.01); *G06F 2203/04108* (2013.01); *G06F 2203/04802* (2013.01); *H04M 2250/12* (2013.01); *H04M 2250/22* (2013.01)

(58) Field of Classification Search
CPC ............... G06F 3/017; G06F 3/04883; G06F 3/04815; G06F 2203/04101; G06F 2203/04108; G06F 2203/04802; H04M 2250/12; H04M 2250/22
USPC ......... 345/156–184, 419, 473, 661; 715/702, 715/863; 340/12.22; 455/63.1, 414.4; 356/3.13
See application file for complete search history.

(56) References Cited

U.S. PATENT DOCUMENTS

| 5,608,850 A * | 3/1997 | Robertson ........... G06F 3/04815 345/427 |
| 6,404,913 B1 * | 6/2002 | Ohki ....................... G06T 15/20 345/422 |

(Continued)

FOREIGN PATENT DOCUMENTS

| JP | 2006-91109 A | 4/2006 |
| JP | 2009-15331 A | 1/2009 |

(Continued)

OTHER PUBLICATIONS

Extended European Search Report issued Nov. 19, 2014, corresponding to European patent application No. 12763260.2.
(Continued)

*Primary Examiner* — Prabodh M Dharia
(74) *Attorney, Agent, or Firm* — Hauptman Ham, LLP

(57) ABSTRACT

According to an aspect, an electronic device includes: a display unit for three-dimensionally displaying a first object; a detecting unit for detecting a displacement of a second object in three-dimensional space where the first object is displayed; and a control unit for performing an operation related to the first object according to the displacement of the second object detected by the detecting unit.

15 Claims, 8 Drawing Sheets

(51) Int. Cl.
*G06F 3/0488* (2013.01)
*G06F 3/0481* (2013.01)

(56) References Cited

U.S. PATENT DOCUMENTS

| | | | | |
|---|---|---|---|---|
| 7,027,054 | B1* | 4/2006 | Cheiky | H04N 5/262 345/473 |
| 7,096,233 | B2* | 8/2006 | Mori | G06F 17/3087 |
| 7,626,569 | B2* | 12/2009 | Lanier | G06F 1/1601 345/156 |
| 7,791,714 | B2* | 9/2010 | Fischer | G01S 7/487 356/5.01 |
| 8,384,769 | B1* | 2/2013 | Hong | H04N 13/004 345/6 |
| 8,500,284 | B2* | 8/2013 | Rotschild | G02B 27/2271 353/10 |
| 8,553,037 | B2* | 10/2013 | Smith | G06T 13/40 345/473 |
| 8,743,089 | B2* | 6/2014 | Sato | G06F 3/017 345/158 |
| 8,797,317 | B2* | 8/2014 | Kim | G06F 3/04815 345/419 |
| 9,137,417 | B2* | 9/2015 | Macciola | G06K 9/3208 |
| 2002/0196422 | A1* | 12/2002 | Tanabata et al. | 356/3.13 |
| 2003/0038786 | A1* | 2/2003 | Nguyen | G06F 1/1624 345/169 |
| 2005/0134577 | A1* | 6/2005 | Lin et al. | 345/173 |
| 2006/0158667 | A1* | 7/2006 | Otani | G06K 15/00 358/1.1 |
| 2006/0279887 | A1* | 12/2006 | Lu | H04M 1/23 361/56 |
| 2007/0137058 | A1* | 6/2007 | Liu | G01B 3/008 33/561 |
| 2007/0229702 | A1* | 10/2007 | Shirono | G02B 7/102 348/374 |
| 2008/0132334 | A1* | 6/2008 | Nonaka et al. | 463/37 |
| 2009/0290014 | A1* | 11/2009 | Takata | 348/61 |
| 2010/0066662 | A1 | 3/2010 | Tomisawa et al. | |
| 2010/0141410 | A1* | 6/2010 | Aono | G06F 3/016 340/407.2 |
| 2010/0207872 | A1* | 8/2010 | Chen et al. | 345/156 |
| 2010/0315417 | A1* | 12/2010 | Cho et al. | 345/419 |
| 2010/0328438 | A1 | 12/2010 | Ohyama et al. | |
| 2011/0007029 | A1* | 1/2011 | Ben-David | 345/174 |
| 2011/0090309 | A1* | 4/2011 | Suzuki | H04N 13/0048 348/43 |
| 2011/0128555 | A1* | 6/2011 | Rotschild | G02B 27/2271 356/625 |
| 2011/0157009 | A1* | 6/2011 | Kim et al. | 345/156 |
| 2012/0066648 | A1* | 3/2012 | Rolleston | G06F 3/04815 715/849 |
| 2012/0098754 | A1* | 4/2012 | Kim | H04N 1/0035 345/173 |
| 2012/0105367 | A1* | 5/2012 | Son | G06F 3/0414 345/174 |
| 2012/0200495 | A1* | 8/2012 | Johansson | G06F 3/011 345/156 |
| 2012/0281018 | A1* | 11/2012 | Yamamoto | G06F 1/1626 345/634 |
| 2013/0005420 | A1* | 1/2013 | Ueno | A63F 9/0826 463/9 |
| 2013/0016246 | A1* | 1/2013 | Hatanaka | G06T 11/00 348/222.1 |
| 2013/0021281 | A1* | 1/2013 | Tse et al. | 345/173 |
| 2013/0065650 | A1 | 3/2013 | Sawada et al. | |
| 2013/0076615 | A1* | 3/2013 | Iao | G06F 3/017 345/156 |
| 2013/0127748 | A1* | 5/2013 | Vertegaal et al. | 345/173 |
| 2013/0128000 | A1* | 5/2013 | Ko | H04N 13/0239 348/47 |
| 2013/0265220 | A1* | 10/2013 | Fleischmann | G06F 3/017 345/156 |
| 2013/0281024 | A1* | 10/2013 | Rofougaran et al. | 455/63.1 |
| 2013/0307827 | A1* | 11/2013 | Reisman | G06F 3/0425 345/175 |
| 2014/0009424 | A1* | 1/2014 | Nagata | G06F 3/0416 345/173 |
| 2014/0071069 | A1* | 3/2014 | Anderson et al. | 345/173 |
| 2014/0168128 | A1* | 6/2014 | Reisman | G06F 3/0425 345/173 |
| 2014/0184496 | A1* | 7/2014 | Gribetz | G02B 27/017 345/156 |
| 2015/0035781 | A1* | 2/2015 | Oshinome | G06F 3/0488 345/173 |
| 2015/0365236 | A1* | 12/2015 | Kim | G06F 3/017 726/18 |

FOREIGN PATENT DOCUMENTS

| | | |
|---|---|---|
| JP | 2009-164794 A | 7/2009 |
| JP | 2010-055507 A | 3/2010 |
| JP | 2011-013778 A | 1/2011 |
| JP | 2011-39990 A | 2/2011 |
| WO | 2008041314 A1 | 4/2008 |

OTHER PUBLICATIONS

International Search Report and Written Opinion corresponding to PCT/JP2012/057603, dated Jun. 26, 2012.

Office Action mailed Jan. 27, 2015, corresponding to Japanese patent application No. 2011-068968, for which an explanation of relevance is attached.

* cited by examiner

ELECTRONIC DEVICE, CONTROL METHOD, AND CONTROL PROGRAM

CROSS-REFERENCE TO RELATED APPLICATION

This application is a National Stage of PCT international application Ser. No. PCT/JP2012/057603 filed on Mar. 23, 2012 which designates the United States, and which is based upon and claims the benefit of priority from Japanese Patent Application No. 2011-068968 filed on Mar. 25, 2011.

FIELD

The present disclosure relates to an electronic device, a control method, and a control program.

BACKGROUND

Touch panels are widely used these days in order to allow an intuitive operation and provide a compact electronic device without a device such as a keyboard that requires a physically large area. In electronic devices with a touch panel, a specific process is assigned to an operation such as a tap detected by the touch panel (e.g., Patent Literature 1).

CITATION LIST

Patent Literature

Patent Literature 1: JP-A-2009-164794

Technical Problem

However, there are only several types of operations that can be detected by the touch panel, such as tap, flick, swipe, and the like. Therefore, the conventional electronic devices with the touch panel cannot provide various ways of operation to users.

For the foregoing reasons, there is a need for an electronic device, a control method, and a control program capable of providing various ways of operation to the user.

SUMMARY

According to an aspect, an electronic device includes: a display unit for three-dimensionally displaying a first object; a detecting unit for detecting a displacement of a second object in three-dimensional space where the first object is displayed; and a control unit for performing an operation related to the first object according to the displacement of the second object detected by the detecting unit.

According to another aspect, a control method executed by an electronic device that includes a display unit, the control method comprising: three-dimensionally displaying a first object on the display unit; detecting a displacement of a second object in three-dimensional space where the first object is displayed; and performing an operation related to the first object according to the detected displacement of the second object.

According to another aspect, a control program for causing an electronic device that includes a display unit to execute: three-dimensionally displaying a first object on the display unit; detecting a displacement of a second object in three-dimensional space where the first object is displayed; and performing an operation related to the first object according to the detected displacement of the second object.

Advantageous Effects of Invention

According to one aspect of the present invention various ways of operation can be provided to users.

DESCRIPTION OF EMBODIMENTS

The aspects of the present invention will be explained in detail below with reference to the drawings. It should be noted that the present invention is not limited by the following explanation. In addition, the components in the explanation below include those which are easily conceived by persons skilled in the art, those which are substantially identical thereto, and those in a scope of so-called equivalents. In the following, a mobile phone is used for explanation as an example of an electronic device; however, a target to which the present invention is applied is not limited to the mobile phones. Therefore, the present invention is also applicable to, for example, PHSs (Personal Handyphone Systems), PDAs, portable navigation devices, notebook computers, and gaming devices.

Embodiments

Figure 1:
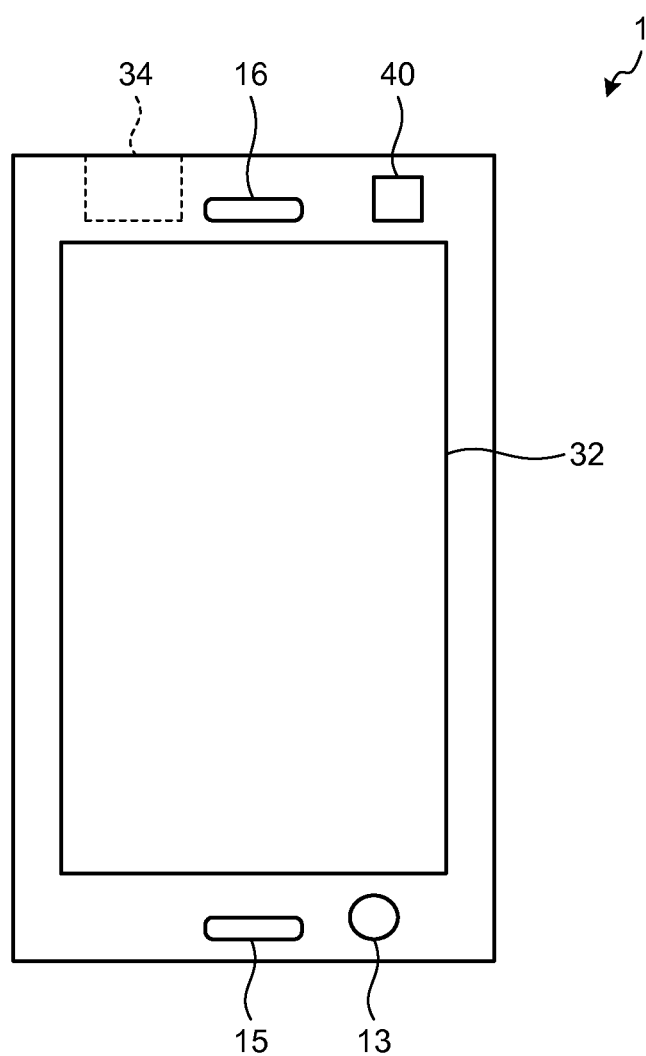
FIG. 1 is a front view illustrating an appearance of a mobile phone (electronic device) according to an embodiment.
Figure 2:
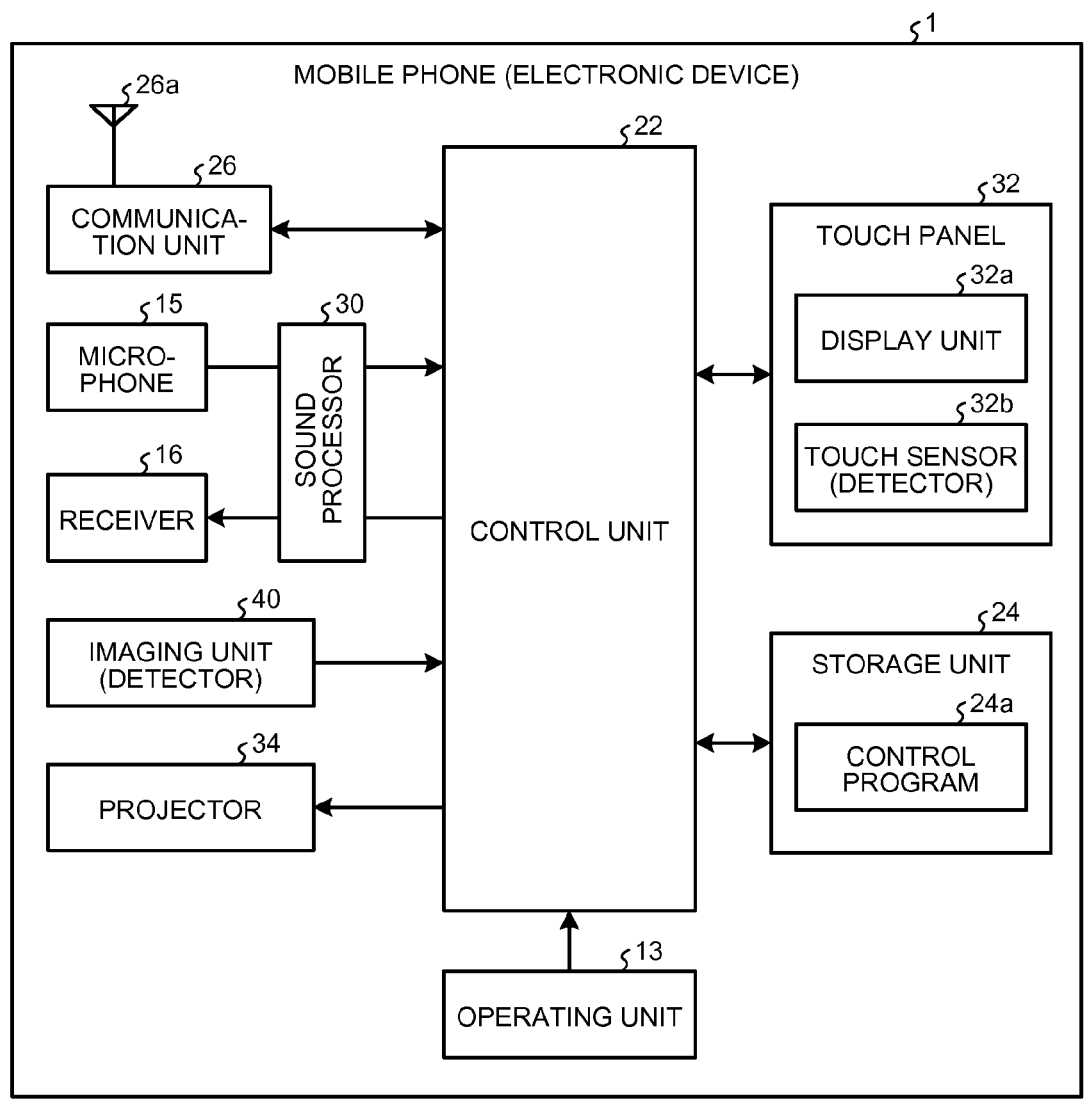
FIG. 2 is a block diagram illustrating a functional configuration of the mobile phone according to the embodiment.

First of all, a configuration of a mobile phone (electronic device) 1 according to a present embodiment will be explained below with reference to FIG. 1 and FIG. 2. FIG. 1 is a front view illustrating an appearance of the mobile phone 1. FIG. 2 is a block diagram illustrating a functional configuration of the mobile phone 1.

As illustrated in FIG. 1 and FIG. 2, the mobile phone 1 includes an operating unit 13, a microphone 15, a receiver 16, a control unit 22, a storage unit 24, a communication unit 26, a sound processor 30, a touch panel 32, a projector 34, and an imaging unit 40. The operating unit 13, the microphone 15, the receiver 16, the touch panel 32, and the imaging unit 40 are partially exposed to the front face of the mobile phone 1.

The operating unit 13 has a physical button, and outputs a signal corresponding to a pressed button to the control unit 22. In the example illustrated in FIG. 1, the operating unit 13 has only one button, but may have a plurality of buttons.

The microphone 15 acquires an external sound. The receiver 16 outputs voice of the other party on the phone. The sound processor 30 converts the sound input from the microphone 15 to a digital signal and outputs the digital signal to the control unit 22. The sound processor 30 decodes the digital signal input from the control unit 22 and outputs the decoded signal to the receiver 16.

The communication unit 26 has an antenna 26a, and establishes a wireless signal path using a CDMA (Code Division Multiple Access) system or so with a base station via a channel allocated by the base station. The communication unit 26 performs telephone communication and information communication with other device over the wireless signal path established between the mobile phone 1 and the base station.

The touch panel 32 displays various pieces of information such as text, graphics, and images, and detects an input operation performed on a predetermined area such as displayed icon, button, and text input area. The touch panel 32 includes a display unit 32a and a touch sensor 32b in an overlapping manner.

The display unit 32a is provided with a display device such as a Liquid Crystal Display or an Organic Electro-Luminescence panel, and displays various pieces of information according to a control signal input from the control unit 22. The touch sensor 32b detects an input operation performed on the surface of the touch panel 32, and outputs a signal corresponding to the detected input operation to the control unit 22. In the present embodiment, the touch sensor 32b is a capacitive type sensor.

In the present embodiment, the touch panel 32 can display a three-dimensional object. The three-dimensional object is an image and a shape created so as to be stereoscopically viewed using disparity. The method for displaying the three-dimensional object may be a method for realizing stereoscopic vision using a tool such as glasses, or may be a method for realizing stereoscopic vision with the naked eyes.

The projector 34 projects an image to a wall surface or to a screen according to the control signal input from the control unit 22. The method that the projector 34 projects an image is not particularly limited. For example, the projector 34 may draw an image by reflecting a laser light irradiated from a light source by an MEMS (Micro Electro Mechanical System) mirror. The projector 34 may be constituted by combining a light source such as a halogen light, LED, or LD with an optical system such as LCD or DMD (Digital Micro-mirror Device).

The imaging unit 40 electrically acquires an image by using an imaging sensor. An angle of view and a layout of the imaging unit 40 are preferably configured so that a finger can be captured no matter where the finger is placed on the touch panel 32. The imaging unit 40 may be a device for acquiring an image of visible light or may be a device for acquiring an image of invisible light such as infrared rays.

The control unit 22 includes a CPU (Central Processing Unit) being a processing unit and a memory being a storage unit, and implements various functions by executing programs using these hardware resources. Specifically, the control unit 22 reads a program or data stored in the storage unit 24 to load it to the memory, and causes the CPU to execute instructions included in the program loaded to the memory. The control unit 22 performs read/write of data from/to the memory and the storage unit 24 and controls operations of the communication unit 26, the display unit 32a, and the like according to the execution result of the instructions executed by the CPU. When the CPU executes instructions, the data loaded to the memory and/or the signal input from the touch sensor 32b or so are used as part of parameters and determination conditions.

The storage unit 24 is formed from a nonvolatile storage device such as a flash memory, and stores therein various programs and data. The program stored in the storage unit 24 includes a control program 24a. The storage unit 24 may be constituted by combining a portable storage medium such as a memory card with a reader/writer for reading/writing data from/to the storage medium. In this case, the control program 24a may be stored in the storage medium. The control program 24a may be acquired from any other device such as a server through wireless communication performed by the communication unit 26.

The control program 24a provides functions for various controls in order to operate the mobile phone 1. The function provided by the control program 24a includes a function for controlling a display of a three-dimensional object on the touch panel 32, a function for controlling projection of an image using the projector 34, and a function for detecting a user operation performed on the three-dimensional object displayed by the touch panel 32.

Figure 3:
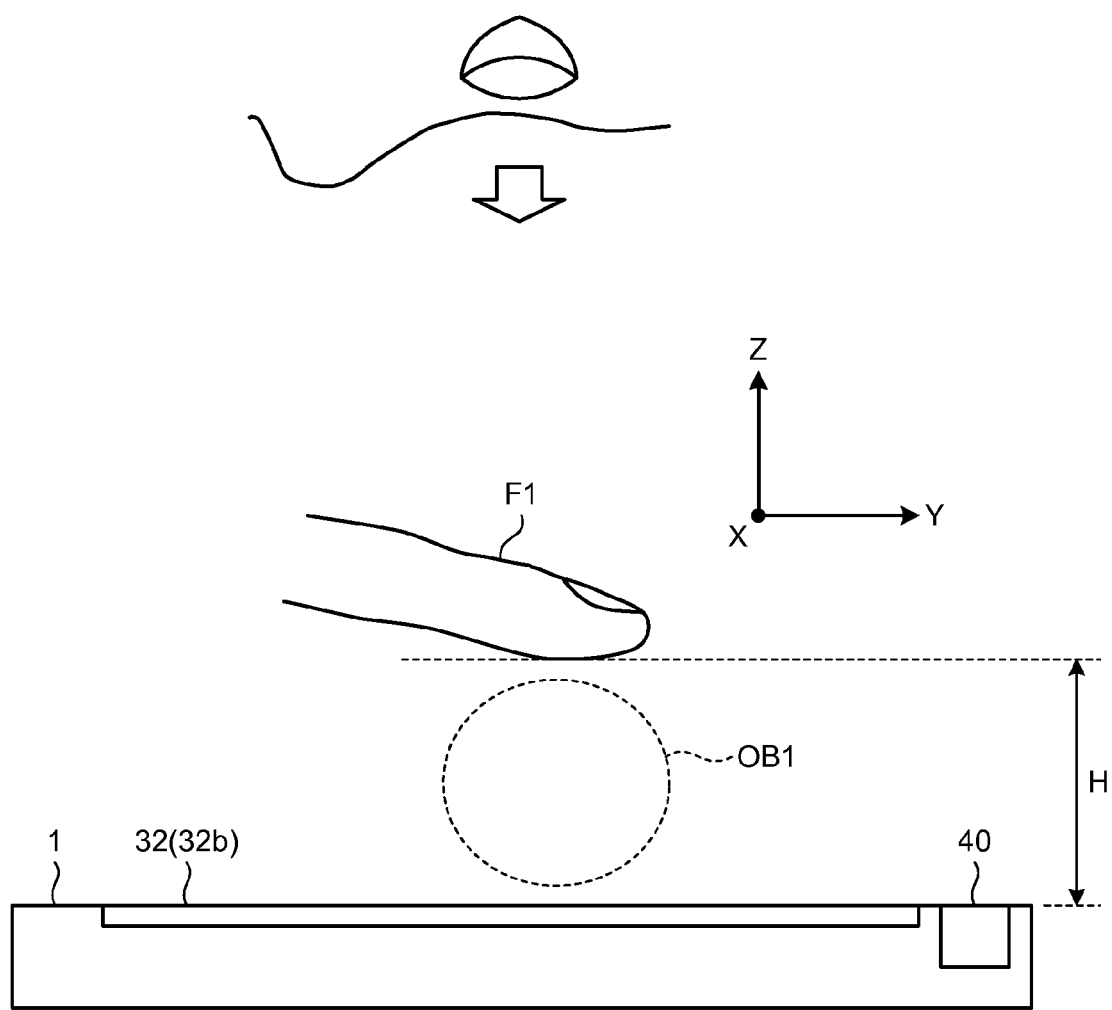
FIG. 3 is a diagram for explaining detection of an operation performed on a three-dimensional object.

Then detection of an operation performed on a three-dimensional object will be explained below with reference to FIG. 3. FIG. 3 is a diagram for explaining detection of an operation performed on a three-dimensional object. Suppose that the touch panel 32 displays a three-dimensional object OB1 as illustrated in FIG. 3. The three-dimensional object OB1 looks to the user as if it is floating in three-dimensional space above the touch panel 32, and therefore a finger F1 with which the user is about to operate the three-dimensional object OB1 does not necessarily touch the touch panel 32. The three-dimensional space means a real space which looks to the user as if the object OB1 exists in a position facing a display surface of the display unit 32a that displays the three-dimensional object.

Therefore, to detect an operation performed on the three-dimensional object, it is preferable to detect not only moves of the finger F1 in an X-axis direction and a Y-axis direction which are parallel to the surface of the touch panel 32 but also a move of the finger F1 in a Z-axis direction which is vertical to the surface of the touch panel 32. Detecting a move of the finger F1 in the Z-axis direction is preferable also in terms of allowing various operations that cannot be implemented only by detecting moves of the finger F1 in the X-axis direction and the Y-axis direction.

The control unit 22 uses either one of or both of the touch sensor 32b and the imaging unit 40 as a detector for detecting a user operation performed on the three-dimensional object. When enhanced in sensitivity, the touch sensor 32b can detect a position of the finger F1 in the X-axis direction and the Y-axis direction even if, for example, a distance H between the finger F1 and the surface of the touch panel 32 in the Z-axis direction is about 10 cm. The control unit 22 can calculate the distance H based on the magnitude of capacitance detected by the touch sensor 32b.

Further, the control unit 22 can calculate positions of the finger F1 in the X-axis direction, the Y-axis direction, and the Z-axis direction from the position and the size of the finger F1 included in an image captured by the imaging unit 40. To improve the precision of a calculated position, a template image of the finger F1 may be previously stored in the mobile phone 1. The control unit 22 may also use a distance between the imaging unit 40 and the finger F1, which is measured by a focusing mechanism in order that the imaging unit 40 focuses on a subject, to calculate a position of the finger F1.

When the touch sensor 3b and the imaging unit 40 are used in combination with each other, respective detection results may be averaged to determine the position of the finger F1. In this case, a weighted average may be used. In an area near the touch panel 32, the weight of the touch sensor 32b is increased because the imaging unit 40 is difficult to acquire an image of the finger F1. In an area far from the touch panel 32, the weight of the imaging unit 40 is increased because the detection precision of the touch sensor 32b becomes low.

Alternatively, other sensor such as a proximity sensor may be used, alone or in combination, to function as a detector for detecting a user operation performed on the three-dimensional object.

Figure 4:
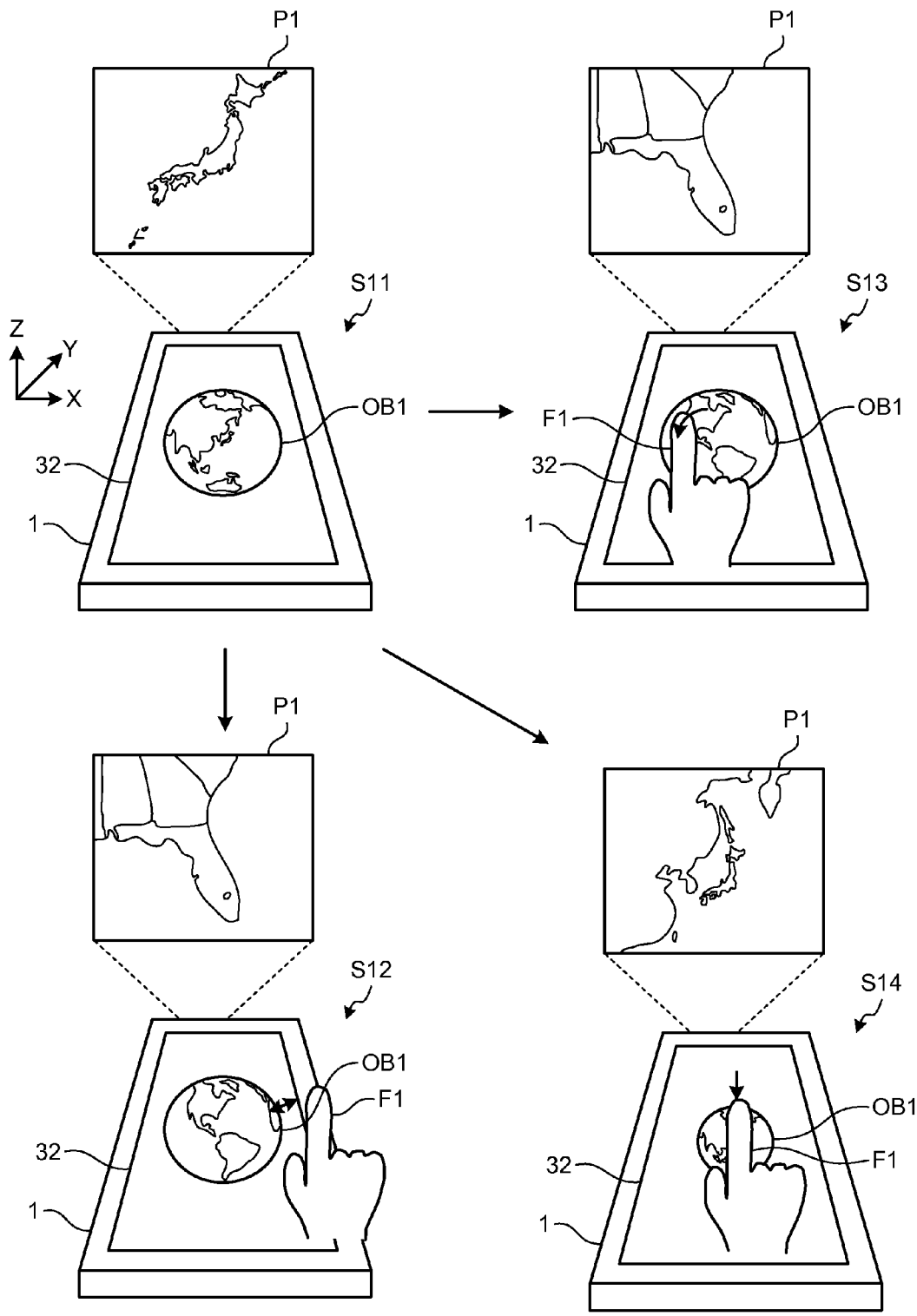
FIG. 4 is a diagram illustrating an example of control realized by detecting an operation performed on the three-dimensional object.
Figure 5:
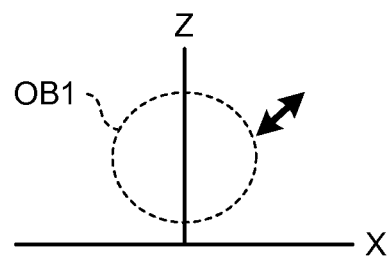
FIG. 5 is a diagram illustrating an example of a path of an operation for bringing a finger into momentary contact to the three-dimensional object.
Figure 6:
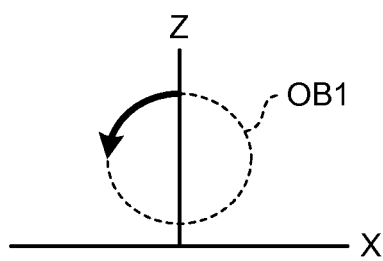
FIG. 6 is a diagram illustrating an example of a path of an operation for moving a finger along the three-dimensional object.
Figure 7:
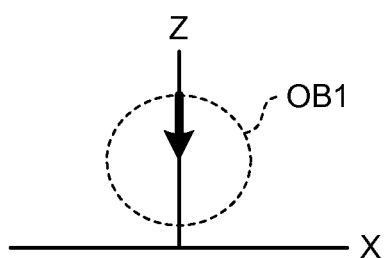
FIG. 7 is a diagram illustrating an example of a path of an operation for pushing the three-dimensional object downward with a finger.

Then an example of controls implemented by detecting operations performed on the three-dimensional object will be explained below with reference to FIG. 4 to FIG. 7. FIG. 4 is a diagram illustrating an example of control realized by detecting an operation performed on the three-dimensional object. FIG. 5 is a diagram illustrating an example of a path of an operation for bringing the finger F1 into momentary contact to the three-dimensional object. FIG. 6 is a diagram illustrating an example of a path of an operation for moving the finger F1 along the three-dimensional object. FIG. 7 is a diagram illustrating an example of a path of an operation for pushing the three-dimensional object downward with the finger.

At Step S11 illustrated in FIG. 4, the control unit 22 displays a spherical globe as the three-dimensional object OB1 on the touch panel 32. Moreover, the control unit 22 projects a map, as a projection image P1, in which Japan displayed at the center of the three-dimensional object OB1 viewed from the above is enlarged, from the projector 34. In this way, the control unit 22 associates the three-dimensional object displayed on the touch panel 32 with an image projected from the projector 34.

A map of Japan is projected herein as an image related to Japan displayed at the center of the three-dimensional object OB1; however, any other image related to Japan such as the national flag and the national flower of Japan may be projected. In addition, a three-dimensional object and an image to be displayed may be previously stored in the storage unit 24 or may be acquired through communication by the communication unit 26.

Suppose that an operation of moving the finger F1 obliquely downward, bringing it into momentary contact to the three-dimensional object OB1, and immediately separating it therefrom is detected in the state of Step S11, as illustrated in FIG. 5. The operation is similar to a tap operation for bringing the finger F1 into momentary contact with the touch panel 32 and immediately separating it therefrom; however, this operation is excellent in a point that any location of the three-dimensional object OB1 can be selected, while the tap operation only allows selection of a point on the plane.

As for the size of the three-dimensional object viewed from the user, if a previously calculated value is included in the data of the three-dimensional object, then the value may be used. The control unit 22 may dynamically calculate the size of the three-dimensional object viewed from the user while controlling the display of the three-dimensional object. Alternatively, the control unit 22 may previously perform calibration to store a correspondence between the range of the three-dimensional object viewed from the user and each position of the finger F1 detected by the touch sensor 32b or so.

When detecting the operation as illustrated in FIG. 5, the control unit 22 determines that a position touched by the finger F1 has been selected and executes a process corresponding to the selected position. The process corresponding to the selected position is, for example, a process for projecting detailed information corresponding to the selected position from the projector 34. In the present embodiment, as the process corresponding to the selected position, a process for rotating the three-dimensional object OB1 so that the selected position is placed at the center thereof is assumed to be executed.

At Step S12 illustrated in FIG. 4, as a result of detecting the operation as illustrated in FIG. 5, the control unit 22 rotates the three-dimensional object OB1 so that a touched area around the Florida Peninsula is placed at the center. The control unit 22 projects a map of the area around the Florida Peninsula, as the projection image P1, which has moved to the center of the three-dimensional object OB1 in association with the rotation of the three-dimensional object OB1 from the projector 34. The direction of moving the finger F1 in order to be brought into momentary contact to the three-dimensional object OB1 is not limited to the obliquely downward direction, and therefore the direction may be any direction.

Suppose an operation of moving the finger F1 along the three-dimensional object OB1 is detected in the state of Step S11, as illustrated in FIG. 6. When detecting the operation as illustrated in FIG. 6, the control unit 22 rotates the three-dimensional object OB1 according to the movement direction and the movement amount of the finger F1. In this way, rotating the three-dimensional object OB1 as the process according to the movement of the finger F1 along the three-dimensional object OB1 is intuitive and easy for the user to remember.

At Step S13 illustrated in FIG. 4, as a result of detecting the operation as illustrated in FIG. 6, the control unit 22 rotates the three-dimensional object OB1 leftward by an angle corresponding to the movement amount of the finger F1. The control unit 22 projects the map of the area around the Florida Peninsula, as the projection image P1, which has moved to the center of the three-dimensional object OB1 in association with the rotation of the three-dimensional object OB1 from the projector 34.

Suppose an operation of pushing the three-dimensional object OB1 downward from the above with the finger F1 is detected in the state of Step S11, as illustrated in FIG. 7. When detecting the operation as illustrated in FIG. 7, the control unit 22 reduces the three-dimensional object OB1 in size according to the amount at which the user pushes the three-dimensional object OB1 downward with his/her finger F1. In this way, reducing the three-dimensional object OB1 as the process according to the operation of pushing the three-dimensional object OB1 downward with the finger F1 is intuitive and easy for the user to remember.

At Step S14 illustrated in FIG. 4, as a result of detecting the operation as illustrated in FIG. 7, the control unit 22 reduces the three-dimensional object OB1 in size. The control unit 22 also reduces the map projected from the projector 34 as the projection image P1 in association with the reduction of the three-dimensional object OB1.

Figure 8:
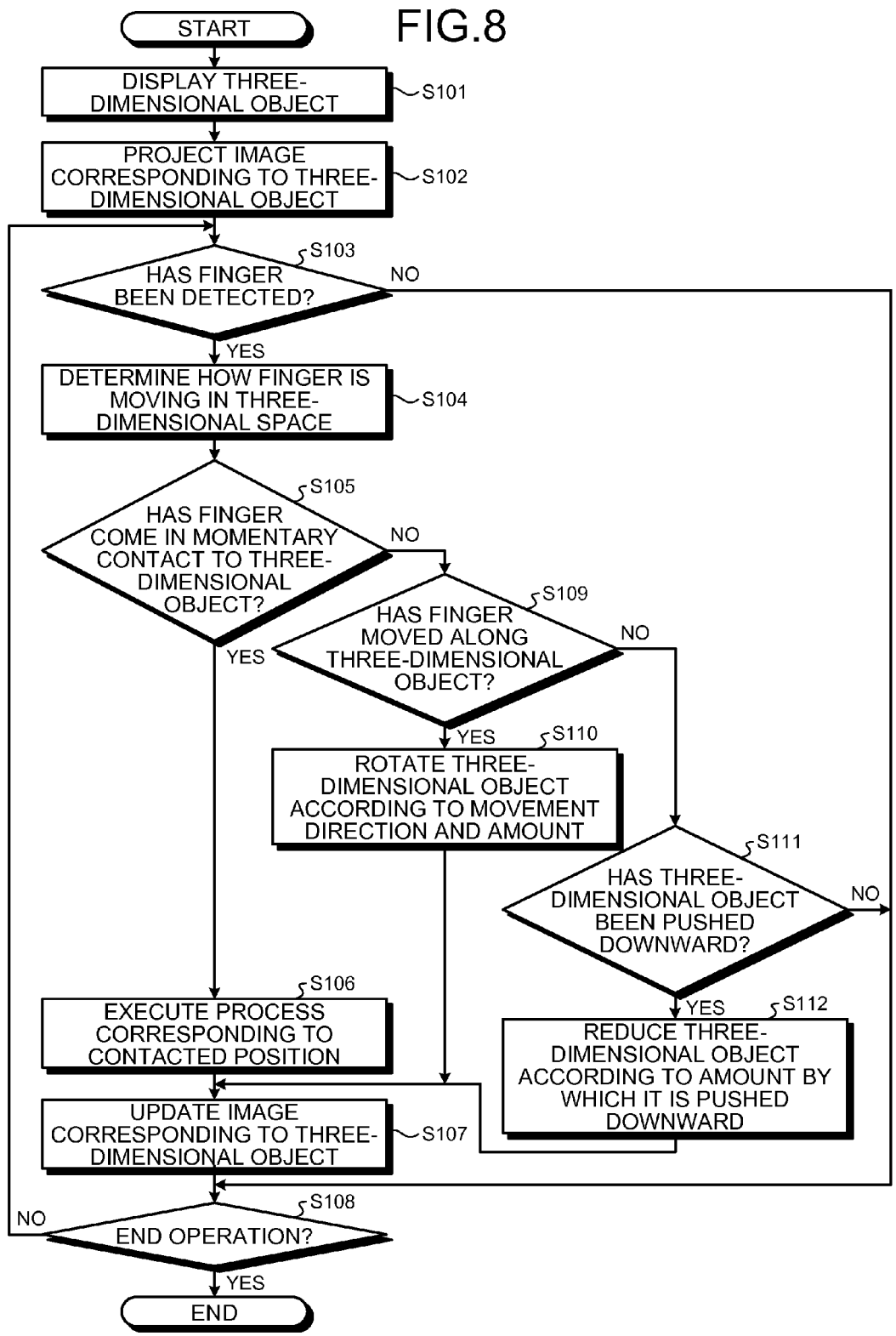
FIG. 8 is a flowchart illustrating a processing procedure of controls executed by the mobile phone in association with detection of operations performed on the three-dimensional object.

Then a processing procedure of controls executed by the mobile phone 1 in association with detection of operations performed on the three-dimensional object will be explained below with reference to FIG. 8. FIG. 8 is a flowchart illustrating a processing procedure of controls executed by the mobile phone 1 in association with detection of operations performed on the three-dimensional object. The processing procedure illustrated in FIG. 8 is implemented by the control unit 22 executing the control program 24*a*.

As illustrated in FIG. 8, first of all, at Step S101, the control unit 22 displays the three-dimensional object on the touch panel 32. Then, at Step S102, the control unit 22 projects an image corresponding to the three-dimensional object from the projector 34.

Subsequently, at Step S103, the control unit 22 determines whether the finger has been detected by the detector. When the finger has not been detected by the detector (No at Step S103), then at Step S108, the control unit 22 determines whether an end operation input by the user has been detected. When the end operation has not been detected (No at Step S108), the control unit 22 re-executes Step S103 and the subsequent steps. Meanwhile, when the end operation has been detected (Yes at Step S108), the control unit 22 ends a series of processing procedure.

When the finger has been detected at Step S103 (Yes at Step S103), then at Step S104, the control unit 22 determines how the finger is moving in the three-dimensional space based on the detection result of the detector. When the operation in which the finger comes in momentary contact to the three-dimensional object has been detected (Yes at Step S105), then at Step S106, the control unit 22 executes the process corresponding to the touched position. At Step S107, the control unit 22 updates the image projected in association with the three-dimensional object, and executes Step S108 which has been explained above.

When a displacement corresponding to the operation in which the finger moves along the three-dimensional object has been detected (No at Step S105, Yes at Step S109), then at Step S110, the control unit 22 rotates the three-dimensional object according to the movement direction and the movement amount of the finger. At Step S107, the control unit 22 updates the image projected in association with the three-dimensional object, and executes Step S108 which has been explained above.

When a displacement corresponding to the operation of pushing the three-dimensional object downward with the finger has been detected (No at Step S109, Yes at Step S111), then at Step S112, the control unit 22 reduces the three-dimensional object according to the amount by which the user pushes the three-dimensional object downward with his/her finger F1. At Step S107, the control unit 22 updates the image projected in association with the three-dimensional object and executes Step S108 which has been explained above.

When either of the operations has not been detected (No at Step S111), the control unit 22 holds the projected image as it is, and executes Step S108 which has been explained above.

As explained above, the present embodiment is configured to detect a user operation based on the move of the finger in the three-dimensional space, and therefore various ways of operation can be provided to the user.

The aspects of the present invention illustrated in the embodiment can be arbitrarily modified within a scope that does not depart from the gist of the present invention. For example, the control program 24*a* described in the embodiment may be divided into a plurality of modules or may be integrated with the other program. In the embodiment, the finger is used to operate the three-dimensional object; however, a stick-like object or so of which tip is charged with static electricity may be used instead of the finger.

The embodiment is configured to detect three types of operations based on the moves of the finger in the three-dimensional space; however, operations detected based on the move of a finger or a hand in the three-dimensional space are not limited thereto. For example, in association with a creation program, the user may operate a three-dimensionally displayed block or clay using fingers to construct a statue or a building. The user may also operate a three-dimensionally displayed steering wheel using a hand to enjoy a race, in association with a race-game program.

The user may operate a three-dimensionally displayed piano or keyboard using fingers to enjoy a performance, in association with a musical instrument program. Moreover, it may be configured, in association with a data display program, that when any part of a three-dimensionally displayed shape is cut using a finger, an image of its cut plane is projected from the projector 34.

In the embodiment, the mobile phone 1 includes a capacitive-type touch panel as a display unit. However, when the imaging unit 40 can precisely detect moves of the finger and the hand in the three-dimensional space, the mobile phone 1 does not have to include the capacitive-type touch panel. In this case, the mobile phone 1 may include a touch panel of any detection type other than the capacitive type as a display unit or may include a device for merely displaying information as a display unit.

In the embodiment, an image related to the three-dimensional object is projected from the projector 34. However, when the mobile phone has a plurality of display units, then it may be configured to display the three-dimensional object on one of the display units and display the image on other display unit.

Figure 9:
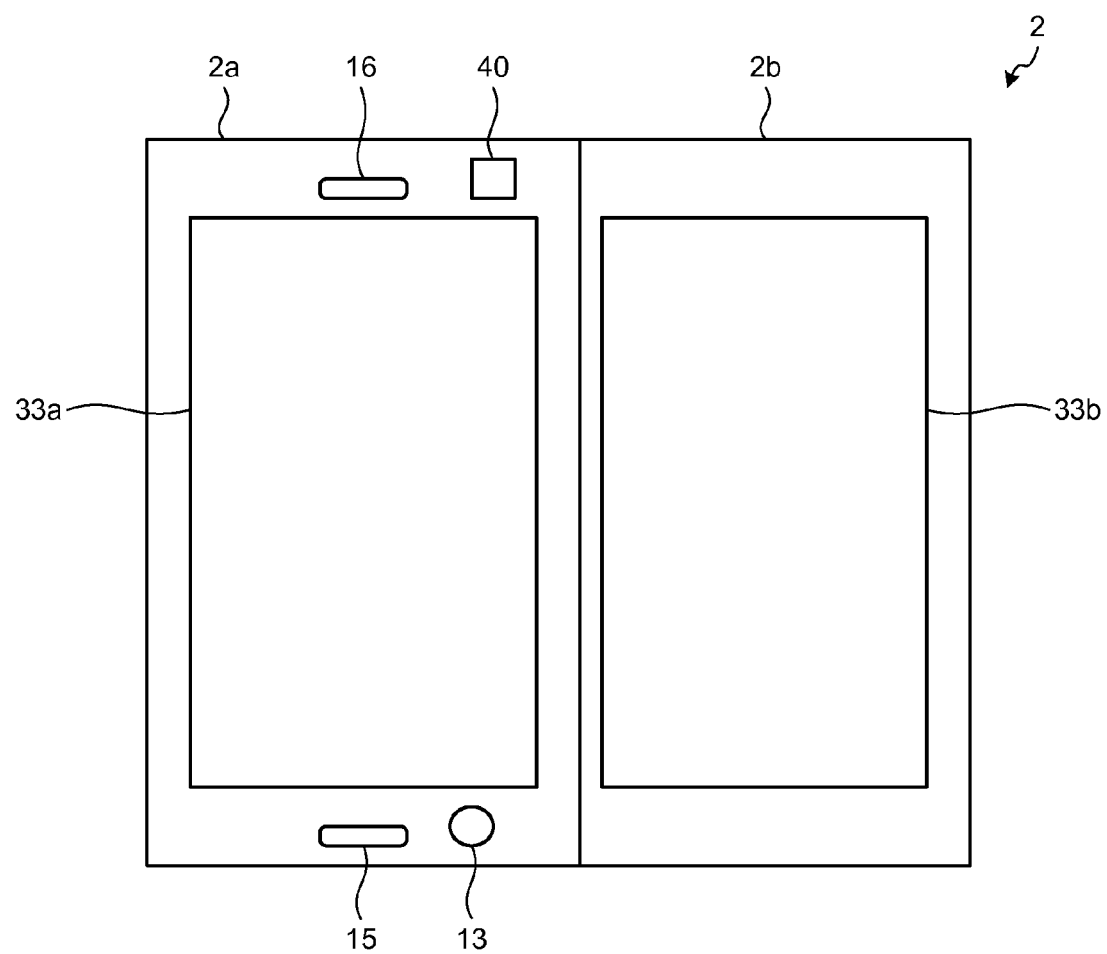
FIG. 9 is a front view illustrating an appearance of a mobile phone with two touch panels.

FIG. 9 is a front view illustrating an appearance of a mobile phone 2 with two touch panels. The mobile phone 2 includes a housing 2*a* and a housing 2*b* which are slidably provided. The housing 2*a* has a touch panel 33*a* and the housing 2*b* has a touch panel 33*b*. The mobile phone 2 exposes the touch panel 33*a* and the touch panel 33*b* to the outside in an open state in which an overlap between the housing 2*a* and the housing 2*b* is minimized, and exposes only the touch panel 33*a* to the outside in a close state in which the housing 2*a* and the housing 2*b* overlap each other.

In the open state, the touch panel 33*a* can be used to display the three-dimensional object, and, in this case, the touch panel 33*b* is used to display the image related thereto. The mobile phone 2 may be a folding type electronic device with a plurality of touch panels.

The embodiment has represented the example of using the imaging unit and the touch sensor to detect a displacement of the predetermined object; however, the embodiment is not limited thereto. For example, instead of the imaging unit, a sensor using a TOF (Time-of-Flight) method may be used. Alternatively, when proximity sensors or so capable of detecting a movement in a planar direction in the space where the three-dimensional display is provided are arranged substantially parallel with the movement direction of the predetermined object, a displacement of the predetermined object also can be detected in a noncontact manner, and therefore these devices may be used. It is preferable that the displacement can be detected without providing the sensor or so in the predetermined object. In this case, there is no need to attach an acceleration sensor to the finger or there is no need to move an electronic device itself with an acceleration sensor, which leads to cost reduction.

The operation related to an object performed corresponding to a detected displacement may be any operation. For example, it may be configured to have some kind of change in the object itself, such as movement of the object or deformation of the object corresponding to the detected displacement.

The embodiment has described the case where the three-dimensional object projects toward the user side; however, the present invention is also applicable to a case of showing the three-dimensional object as if it is present in a deeper side than the display unit. In this case, the sensor and the camera may be provided in the back side of the display unit. If the electronic device is a mobile phone, many mobile phones are provided with an in-camera for capturing the user himself/herself and an out-camera for capturing landscapes and the like. Therefore, it may be configured to capture a displacement of the predetermined object in the back side by using the out-camera.

The invention claimed is:

1. An electronic device, comprising:
a display unit configured to stereoscopically display a first object to appear as a three-dimensional object floating in a three-dimensional space above the display unit;
a detecting unit configured to detect a displacement of a second object in the three-dimensional space above the display unit;
a control unit configured to perform an operation related to the first object according to the displacement of the second object detected by the detecting unit; and
a projecting unit configured to project an image related to the first object,
wherein
the detecting unit is configured to detect, in the three-dimensional space, a position on which the second object touches the first object,
the control unit is configured to change the image projected by the projecting unit according to the position,
the detecting unit includes an imaging unit,
an angle of view and a layout of the imaging unit are configured to capture the second object no matter where the second object is placed over the display unit, and
when the detecting unit detects that the second object moves the first object toward a plane of the display unit, the control unit is configured to reduce a size of the first object which is stereoscopically displayed according to an amount by which the second object moves the first object toward the plane of the display unit.

2. The electronic device according to claim 1, wherein when the detecting unit detects a displacement in which the second object moves along the first object, the control unit is configured to rotate the first object corresponding to a movement direction of the second object.

3. The electronic device according to claim 2, wherein the control unit is further configured to rotate the first object by an angle according to a movement amount of the operation.

4. The electronic device according to claim 1, wherein when the detecting unit detects an operation in which the second object contacts the first object and then separates from the first object, the control unit executes a process corresponding to the position on which the first object is contacted by the second object.

5. The electronic device according to claim 2, wherein when the detecting unit detects the displacement in which the second object moves along the first object, the control unit is further configured to rotate the image, that is projected by the projecting unit and related to the first object, corresponding to the movement direction of the second object.

6. The electronic device according to claim 1, wherein the detecting unit further includes a capacitive touch sensor.

7. The electronic device according to claim 1, wherein when the detecting unit detects the second object moves toward the plane of the display unit in the vertical direction, the control unit is further configured to reduce a size of the image that is projected by the projecting unit and related to the first object.

8. The electronic device according to claim 1, wherein the control unit is configured to change the first object and the image according to the position on which the second object touches the first object.

9. The electronic device according to claim 8, wherein the control unit is configured to change the image according to the changed first object.

10. The electronic device according to claim 1, wherein the detecting unit includes proximity sensors configured to detect a movement of the second object in a planar direction in the three-dimensional space in a noncontact manner with the second object when the proximity sensors are arranged substantially parallel with a movement direction of the second object.

11. An electronic device, comprising:
a first display unit configured to stereoscopically display a first object to appear as a three-dimensional object floating in a three-dimensional space above the display unit;
a detecting unit configured to detect a displacement of a second object in the three-dimensional space above the first display unit;
a control unit configured to perform an operation related to the first object according to the displacement of the second object detected by the detecting unit; and
a second display unit configured to display an image related to the first object,
wherein
the detecting unit is configured to detect, in the three-dimensional space, a position on which the second object touches the first object,
the control unit is configured to change the image related to the first object and displayed on the second display unit according to the position,
the detecting unit includes an imaging unit,
an angle of view and a layout of the imaging unit are configured to capture the second object no matter where the second object is placed over the first display unit, and
when the detecting unit detects that the second object moves the first object toward a plane of the first display unit, the control unit is configured to reduce a size of the first object which is stereoscopically displayed according to an amount by which the second object moves the first object toward the plane of the first display unit.

12. The electronic device according to claim 11, wherein when the detecting unit detects a displacement in which the second object moves along the first object, the control unit is configured to rotate the first object corresponding to a movement direction of the second object.

13. The electronic device according to claim 12, wherein when the detecting unit detects the displacement in which the second object moves along the first object, the control unit is further configured to rotate the image, that is displayed by the second display unit and related to the first object, corresponding to the movement direction of the second object.

14. The electronic device according to claim 11, wherein when the detecting unit detects the second object moves toward the plane of the display unit in the vertical direction, the control unit is further configured to reduce a size of the image that is displayed by the second display unit and related to the first object.

15. The electronic device according to claim 11, wherein the detecting unit includes proximity sensors configured to detect a movement of the second object in a planar direction in the three-dimensional space in a noncontact manner with the second object when the proximity sensors are arranged substantially parallel with a movement direction of the second object.

* * * * *